United States Patent [19]
Ishizuya et al.

[11] 3,994,271
[45] Nov. 30, 1976

[54] INTAKE AND EXHAUST MANIFOLD SYSTEM FOR INTERNAL COMBUSTION ENGINE

[75] Inventors: Akira Ishizuya, Wako; Soichi Nakano, Kawagoe; Yasumichi Ohama, Mitaka, all of Japan

[73] Assignee: Honda Giken Kogyo Kabushiki Kaisha, Tokyo, Japan

[22] Filed: Jan. 20, 1975

[21] Appl. No.: 542,561

[30] Foreign Application Priority Data
Jan. 29, 1974 Japan.................. 49-11433

[52] U.S. Cl................. 123/122 AB; 60/282; 60/322; 123/32 SP; 123/52 M; 123/122 AC
[51] Int. Cl.² ....................................... F02B 19/10
[58] Field of Search.......... 123/32 ST, 32 SP, 52 M, 123/75 B, 122 A, 122 AB, 122 AC, 191 S, 191 SP; 165/52; 60/322, 282

[56] References Cited
UNITED STATES PATENTS

| | | | |
|---|---|---|---|
| 1,777,472 | 10/1930 | Mock et al. ................... | 123/122 AB |
| 3,543,736 | 12/1970 | Suzuki et al. ................ | 123/122 A X |
| 3,703,083 | 11/1972 | Tadokoro ....................... | 60/322 |
| 3,799,196 | 3/1974 | Scheitlin ........................ | 60/282 X |
| 3,895,617 | 7/1975 | Sakurai ......................... | 123/122 AB |

*Primary Examiner*—Charles J. Myhre
*Assistant Examiner*—Tony M. Argenbright
*Attorney, Agent, or Firm*—Lyon & Lyon

[57] ABSTRACT

A manifold system for a multi-cylinder internal combustion piston engine has an intake manifold for supplying a lean mixture to the main combustion chambers of the engine and a rich mixture to the auxiliary combustion chambers thereof. In such an engine, each main combustion chamber is connected to its respective auxiliary combustion chamber through a torch opening. The manifold system also includes an exhaust manifold having improved means for heating the lean mixture and the rich mixture in the intake manifold, and constructed to provide a longer residence time for the exhaust gases and to promote a high mean temperature so that the chemical reaction between the excess air and carbon monoxide and unburned hydrocarbons may add additional heat, to the end that exhaust emissions to the atmosphere of carbon monoxide and unburned hydrocarbons are minimized.

15 Claims, 3 Drawing Figures

3,994,271

INTAKE AND EXHAUST MANIFOLD SYSTEM FOR INTERNAL COMBUSTION ENGINE

This invention relates to improvements over the copending application of Nakano et al. Ser. No. 412,662 filed Nov. 5, 1973, now abaondoned entitled "Manifold System For An Internal Combustion Engine". That application is incorporated into this application by reference. That application discloses a multi-cylinder internal combustion piston engine having a main combustion chamber and an auxiliary combustion chamber associated with each cylinder. A torch opening connects each main combustion chamber to its associated auxiliary combustion chamber. At the end of the compression stroke, a spark ignites the mixture in the auxiliary combustion chamber and this produces a torch flame which passes through the torch opening to ignite the mixture in the main combustion chamber.

Also in that prior application there is shown a manifold assembly which includes an intake manifold for supplying lean mixture to the main combustion chambers and rich mixture to the auxiliary combustion chambers. The manifold assembly also includes an exhaust manifold comprising a thin wall liner formed of heat resistant material spaced within and enclosed by a thick wall housing. Hot exhaust gases in the liner are used to heat both the lean mixture and the rich mixture in the intake manifold.

In accordance with the present invention, an improved exhaust system is provided to increase the residence time of the hot exhaust gases before being discharged into the atmosphere, and to maintain a higher mean temperature of the exhaust gases over the full operating range of the engine. This is accomplished by modifying the construction of the liner as well as providing an inner liner which receives the flow of exhaust gases from the main combustion chambers. The inner liner is constructed to contain two separate chambers connected by an opening, and the discharge opening from the second chamber is aligned with a modified portion of the liner. This portion of the liner contains a port through which hot gases may circulate to heat the lean mixture and the rich mixture in the intake manifold.

Other and more detailed objects and advantages will appear hereinafter.

Figure 1:
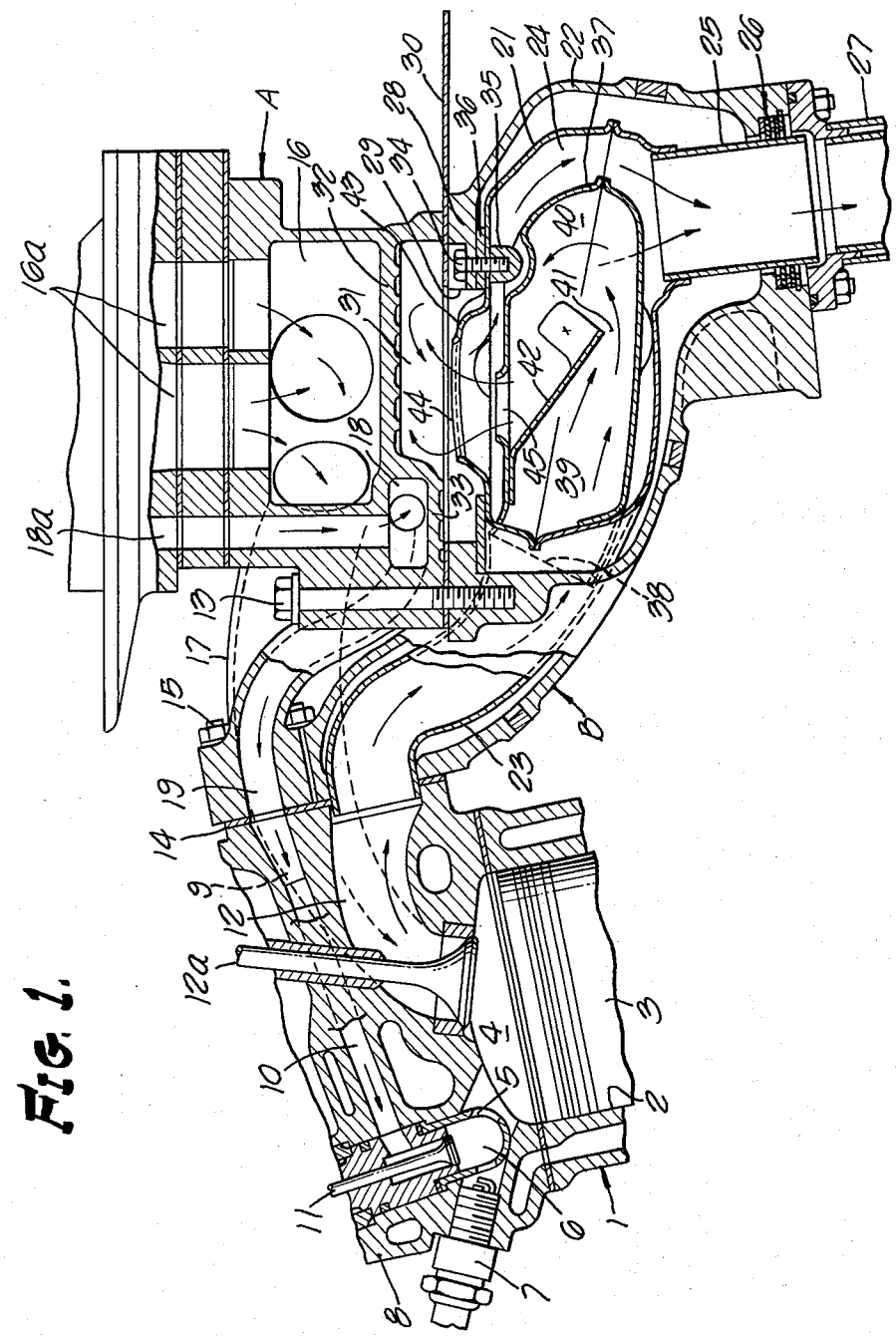
FIG. 1 is a sectional side elevation showing a preferred embodiment of this invention.
Figure 2:
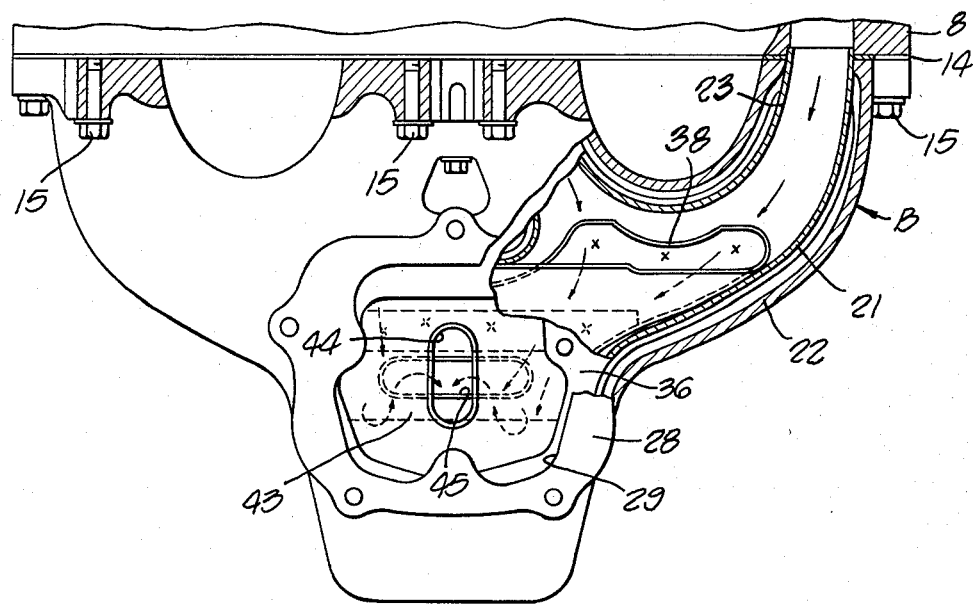
FIG. 2 is a plan view partly in section and partly broken away, certain parts being omitted.
Figure 3:
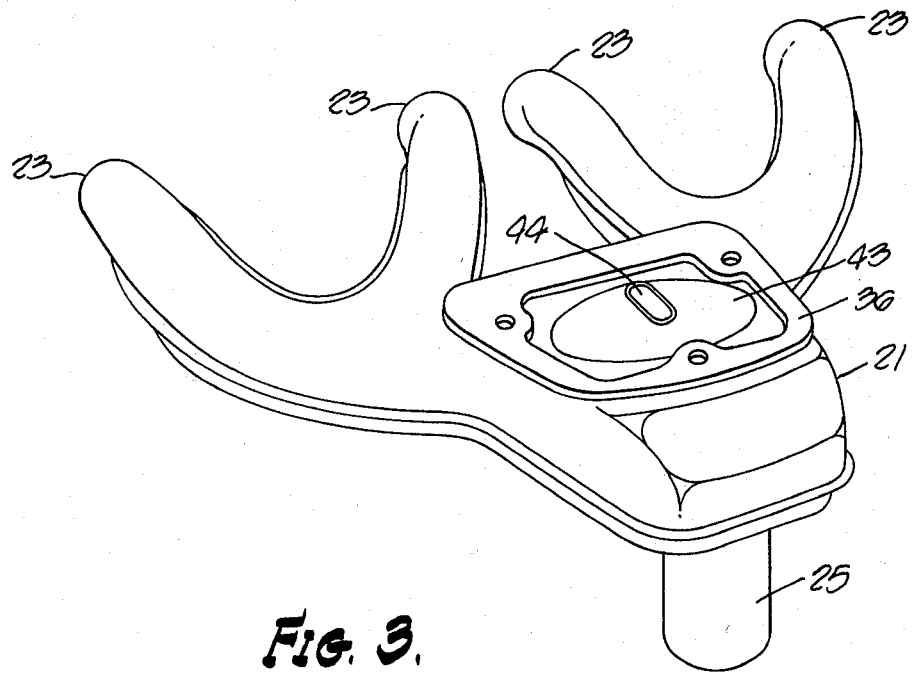
FIG. 3 is a perspective view of the liner.

Referring to the drawings, the internal combustion engine 1 has a plurality of cylinders 2 each with a reciprocating piston 3 which forms one wall of a main combustion chamber 4. A torch opening 5 connects each main combustion chamber to its respective auxiliary combustion chamber 6. A spark plug 7 is provided to ignite an air-fuel mixture in the auxiliary chamber 6, to project a flame through the torch opening 5 to burn a lean air-fuel mixture in the main combustion chamber 4. The cylinder head 8 contains main intake passages 9 for supplying a lean air-fuel mixture to each of the main combustion chambers 4. A main intake valve (not shown) is provided for each main combustion chamber 4. The cylinder head 8 is also provided with auxiliary intake passages 10 for supplying rich air-fuel mixture to each of the auxiliary combustion chambers 6 through auxiliary inlet valves 11. The cylinder head 8 is also provided with exhaust passages 12 controlled by exhaust valves 12a for discharging hot exhaust gases from the main combustion chambers 4. The valves are operated in timed sequence by conventional mechanism.

The manifold system includes an intake manifold A and an exhaust manifold B detachably connected by threaded fastenings 13. Both intake and exhaust manifolds A and B are connected to the cylinder head 8 at the joint 14 by means of threaded fastenings 15. The intake manifold A is provided with a main intake distribution chamber 16 from which extend main intake passageways 17 each connected to one of the main intake passages 9 in the cylinder head 8. Similarly, the intake manifold A has an auxiliary intake distribution chamber 18 from which extend auxiliary intake passageways 19 which connect to the auxiliary intake passages 10 in the cylinder head 8.

A main carburetor having two barrels 16a supplies a lean air-fuel mixture to the main intake distribution chamber 16. Similarly, an auxiliary carburetor having a single barrel 18a supplies a rich air-fuel mixture to the auxiliary intake distribution chamber 18. The engine operates on an over-all air-fuel ratio which is leaner than the stoichiometric ratio.

The exhaust manifold B comprises a thin wall liner 21 of heat resistant material enveloped by and spaced within a thick wall housing 22. The liner 21 has a plurality of entry pipes 23 each connected to one of the exhaust passages in the cylinder head 8 and all connected to the reaction chamber 24 within the liner 21. An exhaust discharge pipe 25 extends from the liner 21 through a sealing assembly 26 in the housing 22 for connection to the pipe 27 leading to a silencer assembly (not shown).

The thick wall housing 22 is provided with a support shoulder 28 having a central opening 29. An aligned opening is formed in the heat shield 30 clamped between the inlet manifold A and the exhaust manifold B. The lower wall 32 of the main intake distribution chamber 16 is in communication with the heating chamber 31 and with the opening 29. Similarly, the lower wall 33 of the auxiliary intake distribution chamber 18 is also in communication with the opening 29. Fastenings 34 cast into the support shoulder 28 of the thick wall housing 22 cooperate with heat resistant parts 35 to clamp the liner 21 and its flange ring 36 in position.

In accordance with this invention, an inner liner 37 formed of thin wall heat resistant material is mounted within the reaction chamber 24 of the liner 21. This inner liner 37 has a pair of entrance openings 38 for receiving the exhaust gases supplied by the entry pipes 23. A baffle 42 is fixed within the inner liner 37 divides the interior of the inner liner 37 into two chambers 39 and 40 connected by the opening 41. The liner 21 has a portion 43 which extends upward into the ring opening 29 and which is provided with a port 44 which extends longitudinally of the reaction chamber 24. The inner liner 37 has a discharge opening 45 aligned with the port 44 but extending at right angles with respect thereto.

Exhaust gases carried into the liner 21 through its entry pipes 23 pass into the openings 38 into the first chamber 39 of the inner liner 37. Gases then pass through the opening 41 into the chamber 40 of the inner liner 37 and then pass outward through the discharge opening 45 into the portion 43 of the liner 21. Gases then pass through the port 44 to heat the walls 32 and 33 and thereby heat the large volume of lean air-fuel mixture passing through the main intake distribution chamber 16 and to heat the small volume of rich air-fuel mixture passing through the auxiliary intake distribution chamber 18. Exhaust gases then flow around the outside of the inner liner 37 and within the chamber 24 and leave the liner 21 through the exhaust discharge pipe 25.

The exhaust gases pass sequentially through the chambers 39 and 40 and through the reaction chamber 24 before entering the exhaust discharge pipe 25. The chamber 39 is designed mainly to function so that a relatively small flow of exhaust gas produced during low power operation of the engine is made to react therewithin. The chamber 40 is designed mainly to function in cooperation with the chamber 39 so that exhaust gas produced during the medium power operation of the engine is made to react therewithin. The enveloping reaction chamber 24 is designed to function in cooperation with chamber 39 and 40 so that exhaust gas produced during high power operation of the engine is made to react therewithin. The discharge opening 45 connecting the chambers 40 and 24 is located close to the first chamber 39 and remotely from the exhaust discharge pipe 25 so that exhaust gases in the reaction chamber 24 are made to act as extensively as possible over the chambers 39 and 40. The portion 43 of the liner 21 which extends into the opening 29 causes the exhaust gas to circulate through the heating chamber 31.

Exhaust gases are maintained at a high mean temperature as they leave the cylinder head 8 through the passages 12 and additional heat is added by continuing chemical reaction between the excess oxygen and unburned hydrocarbons. Additional heat is also generated by the chemical reaction oxidizing carbon monoxide to carbon dioxide. Accordingly, the contents of the chamber 40 tends to be hotter than that of the chamber 39, and the contents of the reaction chamber 24 would be hotter than that of the chamber 40, except for the cooling effect of the thick wall of the housing 22. The construction of the liner 21 and the inner liner 37 is such that the residence time of the exhaust gases is lengthened while high temperature is maintained to promote the chemical reactions.

Having fully described our invention, it is to be understood that we are not to be limited to the details herein set forth, but that our invention is of the full scope of the appended claims.

We claim:

1. A manifold system for a multi-cylinder internal combustion piston engine of the type having an auxiliary combustion chamber associated with each main combustion chamber and connected thereto by a torch opening, the manifold system comprising, in combination: an intake manifold having a main intake chamber and an auxiliary intake chamber, said intake manifold also having passage means leading from the main intake chamber and passage means leading from the auxiliary intake chamber, an exhaust manifold comprising a thin wall metallic liner enveloped by and spaced withinn a thick wall housing, said housing having a lateral opening, one wall of each of said intake chambers being in communication with said lateral opening, a thin wall metallic inner liner enveloped by and spaced within the first said liner and adapted to receive exhaust gases from said engine, the first said liner having a port communicating with said lateral opening, said inner liner having a discharge opening in alignment with said port, an exhaust discharge pipe connected to the first said liner, whereby exhaust gases pass through said inner liner and discharge opening and through said port to heat the intake chambers before passing out the exhaust discharge pipe.

2. The manifold system set forth in claim 1 in which a plurality of inlet openings are provided in said inner liner.

3. The manifold system set forth in claim 1 in which baffle means are provided for dividing the inner liner into two connected chambers, one of said chambers being connected to receive exhaust gases from said engine, and the other having said discharge opening.

4. The manifold system set forth in claim 1 in which the port in the liner extends in one direction and the discharge opening in the inner liner extends in a direction substantially at right angles thereto.

5. The manifold system set forth in claim 1 in which the liner has a portion extending into said lateral opening, said port being formed in that portion of the liner.

6. The manifold system set forth in claim 1 in which the lateral opening is provided in a support shoulder on the housing, and wherein the intake manifold is detachably connected to said support shoulder.

7. A manifold system for a multi-cylinder internal combustion piston engine of the type having an auxiliary combustion chamber associated with each main combustion chamber and connected thereto by a torch opening, the manifold system comprising, in combination: an intake manifold including a main intake chamber and main intake passageways extending therefrom, said intake manifold also including an auxiliary intake chamber and auxiliary intake passageways extending therefrom, an exhaust manifold comprising a thin wall metallic liner enveloped by and spaced within a thick wall housing, said housing having a lateral opening, one wall of each said intake chambers being in communication with said lateral opening, said liner having an exhaust discharge pipe, said liner also having a port communicating with said lateral opening, a thin wall metallic inner liner positioned within the first said liner, baffle means for dividing the inner liner into two connected chambers, one of said connected chambers having inlet opening means to receive the exhaust gases from the engine, the other of said connected chambers having a discharge opening, said port and said discharge opening being in alignment with said lateral opening, whereby exhaust gases pass through said inner liner and then around said inner liner to reach said exhaust discharge pipe.

8. A manifold system for a multi-cylinder internal combustion piston engine having combustion chambers, the manifold system comprising, in combination: an intake manifold having an intake chamber and having passage means leading from the intake chamber, an exhaust manifold comprising a thin wall metallic liner enveloped by and spaced within a thick wall housing, said housing having a lateral opening, one wall of said intake chamber being in communication with said lateral opening, said liner having a reaction chamber receiving exhaust gases from the engine and having an exhaust discharge pipe, said liner having a port communicating with said lateral opening, a thin wall metallic inner liner positioned within said reaction chamber, said inner liner having inlet opening means to receive exhaust gases entering said reaction chamber, said inner liner also having a discharge opening in alignment with said port in the liner, whereby exhaust gases pass through said inner liner and said discharge opening to heat said intake chamber before passing out the exhaust discharge pipe.

9. The manifold system set forth in claim 8 in which the lateral opening is provided in a support shoulder on the housing, and wherein the intake manifold is detachably connected to said support shoulder.

10. A manifold system for a multi-cylinder internal combustion piston engine having combustion chambers, the manifold system comprising, in combination: an intake manifold including an intake chamber and intake passageways extending therefrom, an exhaust manifold comprising a thin wall metallic liner enveloped by and spaced within a thick wall housing, said housing having a lateral opening, one wall of said intake chamber being in communication with said lateral opening, said liner having an exhaust discharge pipe, said liner having a port communicating with said lateral opening, a thin wall metallic inner liner positioned within said liner, baffle means for dividing the inner liner into two connected chambers, one of said connected chambers having inlet opening means to receive the exhaust gases from the engine, the other of said connected chambers having a discharge opening in alignment with said port in the liner, whereby exhaust gases pass through said inner liner and then around said inner liner to reach said exhaust discharge pipe.

11. In a manifold assembly for an internal combustion engine having a plurality of pistons each forming one wall of a plurality of combustion chambers, respectively, the improvement comprising; in combination: an intake manifold for supplying an air-fuel mixture to the engine, an exhaust manifold including thin wall metallic inner and outer liners both enveloped by and spaced within a thick wall housing, means establishing communication between said inner liner and said outer liner, said outer liner having a reaction chamber with an exhaust discharge pipe, said inner liner being positioned within said outer liner and dividing the reaction chamber into an inner chamber and an outer chamber, a plurality of entry pipes for inducting exhaust gases from said engine into said inner chamber, means placing a portion of said intake manifold in thermal communication with said outer chamber whereby exhaust gases pass from the inner chamber through said outer chamber to heat a portion of said intake manifold before passing out through said exhaust discharge pipe.

12. The combination set forth in claim 11 in which said inner liner contains a baffle to divide said inner chamber into two subchambers, one of the subchambers being connected to said entry pipes and the other subchamber communicating with said outer chamber.

13. The combination set forth in claim 11 in which each entry pipe has an entrance end axially movable with respect to said housing, and wherein the discharge pipe is axially movable with respect to said housing, and fastening means for securing said liners with respect to said housing.

14. In a manifold assembly for an internal combustion engine having a plurality of pistons each forming one wall of a plurality of combustion chambers, respectively, the improvement comprising, in combination: an intake manifold for supplying an air-fuel mixture to the engine, an exhaust manifold including thin wall metallic inner and outer liners both enveloped by and spaced within a thick wall housing, means establishing communication between said inner liner and said outer liner, said outer liner having a reaction chamber with an exhaust discharge pipe, said inner liner being positioned within said outer liner and dividing the reaction chamber into at least two inner and outer chambers, a plurality of entry pipes for inducting exhaust gases from said engine into said inner liner, said housing having a lateral opening, fastening means for securing said liners with respect to said housing, said outer liner having a port in alignment with said lateral opening, a portion of said intake manifold being in thermal communication with said port through said housing opening whereby exhaust gases pass through said outer chamber to heat a portion of said intake manifold before passing out through said exhaust discharge pipe.

15. The manifold assembly set forth in claim 14 in which said lateral opening is provided in a support shoulder on said housing, and wherein said intake manifold is detachably connected to said support shoulder.

* * * * *